(12) United States Patent
Tan et al.

(10) Patent No.: US 10,698,270 B2
(45) Date of Patent: Jun. 30, 2020

(54) LIQUID CRYSTAL DISPLAY PANEL, METHOD THEREOF, AND LIQUID CRYSTAL DISPLAY DEVICE

(71) Applicant: BOE TECHNOLOGY GROUP CO., LTD., Beijing (CN)

(72) Inventors: Jifeng Tan, Beijing (CN); Xiandong Meng, Beijing (CN); Wei Wang, Beijing (CN); Wenqing Zhao, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 12 days.

(21) Appl. No.: 16/143,859

(22) Filed: Sep. 27, 2018

(65) Prior Publication Data

US 2019/0204691 A1 Jul. 4, 2019

(30) Foreign Application Priority Data

Jan. 2, 2018 (CN) .......................... 2018 1 0002377

(51) Int. Cl.
*G02F 1/1343* (2006.01)
*G02F 1/1335* (2006.01)
(Continued)

(52) U.S. Cl.
CPC ...... *G02F 1/134309* (2013.01); *G02F 1/1343* (2013.01); *G02F 1/13306* (2013.01);
(Continued)

(58) Field of Classification Search
CPC ......... G02F 1/133512; G02F 1/136209; G02F 1/134309; G02F 1/1343;
(Continued)

(56) References Cited

U.S. PATENT DOCUMENTS

2004/0041965 A1 3/2004 Liu
2010/0225852 A1 9/2010 Taira et al.
(Continued)

FOREIGN PATENT DOCUMENTS

CN 101625498 A 1/2010
CN 102654665 A 9/2012
(Continued)

OTHER PUBLICATIONS

First Office Action for CN Appl. No. 20181002377.9, dated Dec. 25, 2019.

*Primary Examiner* — Jia X Pan
(74) *Attorney, Agent, or Firm* — Foley & Lardner LLP (57) ABSTRACT

The present disclosure provides a liquid crystal display panel, an operating method thereof, and a liquid crystal display device. A liquid crystal display panel comprises: A liquid crystal display panel comprising: a first substrate including light-shielding portions and light-transmitting portions; an electrode layer including a plurality of discrete electrodes; a liquid crystal layer; wherein the liquid crystal layer is adaptable to form an array of liquid crystal optical elements according to voltages of the electrodes, and wherein the voltages of the electrodes are configured such that the array of liquid crystal optical elements formed in the liquid crystal layer guides light to the light-shielding portions of the first substrate, to perform a dark-state (L0) display, wherein the light is incident onto the liquid crystal layer.

13 Claims, 6 Drawing Sheets

(51) Int. Cl.
*G02F 1/133* (2006.01)
*G02F 1/29* (2006.01)
*G02F 1/13357* (2006.01)

(52) U.S. Cl.
CPC .. *G02F 1/133512* (2013.01); *G02F 1/133526* (2013.01); *G02F 1/133615* (2013.01); *G02F 1/292* (2013.01); *G02F 2001/133626* (2013.01); *G02F 2201/40* (2013.01)

(58) Field of Classification Search
CPC ... G02F 2001/133626; G02F 1/133615; G02F 1/133526; G02F 1/292; G02F 2001/294; G02F 1/133606; G02F 1/133504; H04N 13/0404; G02B 27/2214
See application file for complete search history.

(56) References Cited

U.S. PATENT DOCUMENTS

| | | | |
|---|---|---|---|
| 2012/0075563 A1* | 3/2012 | Takeda | G02F 1/133377 349/139 |
| 2014/0055716 A1* | 2/2014 | Zhang | G02F 1/133512 349/64 |
| 2015/0153578 A1* | 6/2015 | Oka | G02B 27/2214 349/15 |
| 2016/0085118 A1* | 3/2016 | Lee | G02F 1/133512 349/62 |
| 2018/0088377 A1* | 3/2018 | Lu | G02F 1/0311 |
| 2018/0239189 A1* | 8/2018 | Koito | G02F 1/133526 |
| 2018/0329265 A1* | 11/2018 | Kaneko | G02F 1/133345 |
| 2019/0094625 A1* | 3/2019 | Haseba | G02F 1/133617 |

FOREIGN PATENT DOCUMENTS

| | | |
|---|---|---|
| CN | 107490901 A | 12/2017 |
| JP | 2015-102808 A | 6/2015 |

\* cited by examiner

LIQUID CRYSTAL DISPLAY PANEL, METHOD THEREOF, AND LIQUID CRYSTAL DISPLAY DEVICE

CROSS-REFERENCE TO RELATED APPLICATIONS

The present application claims priority of Chinese Patent Application No. 201810002377.9 filed on Jan. 2, 2018, the entire contents of which are hereby incorporated by reference.

FIELD

The present disclosure relates to the field of display technology, and in particular, to a liquid crystal display panel, a method thereof, and a liquid crystal display device.

BACKGROUND

In the liquid crystal display panels of the prior art, a light-extracting member is employed to extract light emitted from a backlight to obtain collimated light. The light-extracting member is usually a light-extracting grating, and the light that passes through the light-extraction grating has a certain degree of collimation. However, factors such as the diffraction by the aperture of the light grating and the process deviation in the processing of the light grating may influence the collimation of the light emitted from the light-extracting grating, resulting in a divergence angle of the light.

Therefore, the width of the light-shielding portion in the display panels needs to be large so as to prevent the diverged light from causing dark-mode light leakage (dark leakage) of the display panel. This, however, may result in decreasing of the width of the light-transmitting portion. Thus, a large width of the light-shielding portion may limit the resolution of the display and the aperture ratio of the pixels, and affect the luminous efficiency of the liquid crystal.

SUMMARY

According to an aspect of the present disclosure, there is provided a liquid crystal display panel comprising: a first substrate including light-shielding portions and light-transmitting portions; an electrode layer including a plurality of discrete electrodes; a liquid crystal layer; wherein the liquid crystal layer is adaptable to form an array of liquid crystal optical elements according to voltages of the electrodes, and wherein in the case of performing a dark-state (L0) display, the voltages of the electrodes are configured such that the array of liquid crystal optical elements formed in the liquid crystal layer guides light, which is incident on the liquid crystal layer, to the light-shielding portions of the first substrate.

In some embodiments, each of the liquid crystal optical elements is configured to correspond to a set of electrodes; and the set of electrodes includes at least three adjacent electrodes, wherein a voltage at an intermediate electrode in the set of electrodes is different from voltages at the electrodes at both sides, so that the corresponding liquid crystal optical element is formed.

In some embodiments, in the case of performing a gray-scale display, the voltages of the electrodes are configured so that the array of the liquid crystal optical elements formed in the liquid crystal layer guides light, which is incident on the liquid crystal layer, to the light-transmitting portions of the first substrate to emit the light.

In some embodiments, in the case of performing the gray-scale display, the array of the liquid crystal optical elements serves as a liquid crystal grating, and the liquid crystal display panel performs display with use of diffraction by the liquid crystal grating or with use of diffraction and refraction by the liquid crystal grating.

In some embodiments, each of electrode cycles includes one electrode and a gap between the electrode and an adjacent electrode, and the voltages of the electrodes in the electrode cycles are equal so that a liquid crystal grating is formed in the liquid crystal layer.

In some embodiments, the electrodes are grouped in cycles, and voltages of the electrodes at same relative positions in the respective cyclic groups are configured to be equal, thereby an array of cyclic liquid crystal optical elements is formed, wherein the array of liquid crystal optical elements functions as a liquid crystal grating in the case of gray-scale display.

In some embodiments, two adjacent groups share one electrode. In some embodiments, a light diffraction efficiency of the liquid crystal grating is positively related to a height of the liquid crystal grating.

In some embodiments, the liquid crystal optical element is a liquid crystal lens, and the width of the light-shielding portion of the first substrate is related to a radial size and a focal length of the corresponding liquid crystal lens.

In some embodiments, the liquid crystal display panel further comprises: a second substrate with at least one light-extracting member disposed on a light-exit surface of the second substrate, wherein the light is incident on the liquid crystal layer through the at least one light-extracting member.

In some embodiments, the electrode layer is disposed on a side of the first substrate, which is facing the liquid crystal layer.

In some embodiments, the liquid crystal display panel further comprises an opposite electrode disposed oppositely to the electrode layer, and further comprising an insulating layer interposed between the electrode layer and the opposite electrode.

In some embodiments, the electrode layer is disposed on a side of the first substrate, which is facing the liquid crystal layer. In some embodiments, the liquid crystal display panel further comprises an opposite electrode disposed on an additional substrate which faces the first substrate, and the liquid crystal layer interposed between the electrode layer and the opposite electrode.

According to another aspect of the present disclosure, there is provided a liquid crystal display device comprising the liquid crystal display panel according to any embodiment of the present disclosure.

According to a further aspect of the present disclosure, there is provided an operating method for a liquid crystal display panel, wherein the liquid crystal display panel comprises: a first substrate including light-shielding portions and light-transmitting portions; an electrode layer comprising a plurality of discrete electrodes; and a liquid crystal layer. The method may comprises: when performing a dark-state display, applying voltages through the electrodes to apply a first electric field to the liquid crystal layer so that the liquid crystal layer forms an array of liquid crystal optical elements to guide light, which is incident to the liquid crystal layer, to the light-shielding portions of the first substrate.

In some embodiments, applying voltages through the electrodes comprises: applying voltages through a set of electrodes including at least three adjacent electrodes, such that the voltage of an intermediate electrode in the set of electrodes is different from the voltages of the electrodes at both sides, thereby forming a respective liquid crystal optical element corresponding to the set of electrodes.

In some embodiments, the method further comprises: when performing a gray-scale display, applying voltages through the electrodes to apply a second electric field to the liquid crystal layer so that a liquid crystal grating is formed in the liquid crystal layer to guide light, which is incident on the liquid crystal layer, to the light-transmitting portions of the first substrate to emit the light.

In some embodiments, applying voltages through the electrodes when performing gray-scale display comprises: grouping the electrodes in cycles; applying an equal voltage to the electrodes of respective electrode cycles to form the liquid crystal grating in the liquid crystal layer, wherein each electrode cycle includes one electrode and a gap between the electrode and an adjacent electrode.

In some embodiments, applying voltages through the electrodes comprises: grouping the electrodes in cycles; and applying an equal voltage to the electrodes of the same relative position in respective cyclic groups to form an array of cyclic liquid crystal optical elements in the liquid crystal layer, wherein, when performing a gray-scale display, the array of the liquid crystal optical elements serves as a liquid crystal grating.

In some embodiments, applying voltages through the electrodes comprises: grouping the electrodes in cycles; applying an equal voltage to the electrodes of the same relative position in respective cyclic groups to form an array of cyclic liquid crystal optical elements in the liquid crystal layer, wherein, when performing a gray-scale display, the array of the liquid crystal optical elements serves as a liquid crystal grating.

In some embodiments, the method further comprises: when performing a gray-scale display, adjusting a height of the liquid crystal grating by controlling a field intensity of the second electric field to adjust a grayscale value of the liquid crystal display panel.

In some embodiments, the liquid crystal display panel further comprises a second substrate with at least one light-extracting member disposed on a light-exit surface of the second substrate, wherein the light is incident onto the liquid crystal layer through the light-extracting member.

In some embodiments, the electrode layer is disposed on a side of one of the first substrate and the second substrate, which is facing the liquid crystal layer; the liquid crystal display panel further comprising an opposite electrode disposed oppositely to the electrode layer, the opposite electrode being disposed to one of the first substrate and the second substrate.

DETAILED DESCRIPTION OF EMBODIMENTS

In order to make the above objects, features, and advantages of the present disclosure more comprehensible, the present disclosure will be further described in detail with reference to the accompanying drawings and specific embodiments.

In the description of the present disclosure, "plurality of" means two or more than two unless otherwise specified. The orientations or positional relationships indicated with the terms such as "upper", "lower", "left", "right", "inner", and "outer", etc., are based on the orientations or positional relationships shown in the drawings and are merely for the convenience and simplicity of describing the present disclosure, and are not intended to indicate or imply that the referred item or element necessarily has a specific orientation or is configured or operated in the specific orientation. Thus, such terms, orientations, or positional relationships shall not to be construed as limits to the present disclosure.

In the description of the present disclosure, it should be noted that the terms "install/mount", "connect", and "couple" and the variants thereof should be construed in a broad sense unless otherwise defined or implied. For example, the term "connect" may refer to a fixed connection, a removable connection, or integrally connected; may refer to mechanical or electrical connection; and may refer to a direct connection or an indirect connection through an intermediate member. For a person with ordinary skills in the art, the specific meanings of the above terms in the present disclosure can be readily understood according to specific situations.

The present disclosure will be further described in detail below with reference to the accompanying drawings and the embodiments. The following embodiments are intended to illustrate the present disclosure but are not intended to limit the scope of the present disclosure.

Figure 1:
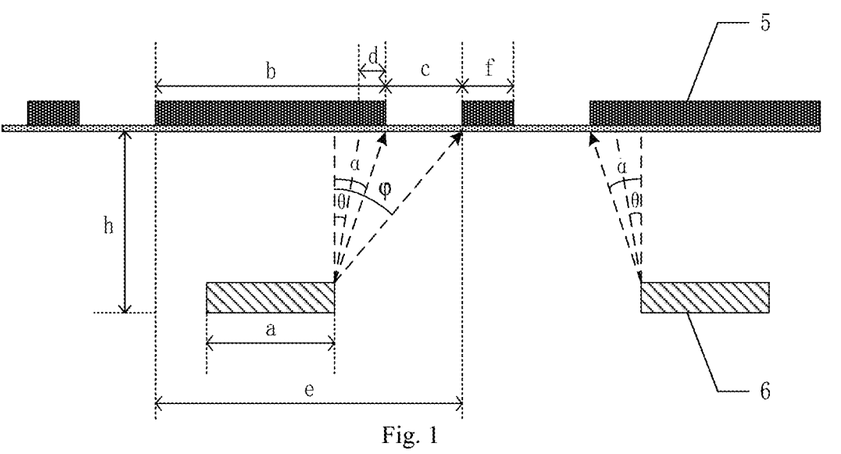
FIG. 1 is a schematic view showing a positional relationship between a light-shielding layer and a light-extracting member in a liquid crystal display panel of the prior art.

Referring to FIG. 1, a schematic diagram of a positional relationship between a light-shielding layer and a light-extracting member in a liquid crystal display panel of the prior art is shown. The light-extracting member 6 and the light-shielding portion 5 of the liquid crystal display panel are disposed facing to each other. The width of the light-shielding portion 5 is b, $b=a+(h*\tan\theta+d)*2$, where a is the width of the light-extracting member 6, h is a distance between the surface on which the light-extracting member 6 is located and the lower surface of the light-shielding portion 5, θ is the angle of the light emitted from the light extracting member 6, and d is a process deviation. The figure also shows: c which is the width of the light-transmitting area (also referred to as the light-transmitting portion) 101, e which is the width of the light-emission grating unit, f which is the width of the light-blocking light-shielding layer, a which is an obstruction angle, and φ which is a transmitting angle. Therefore, the width of the light-shielding portion 5 needs to be large in order to prevent the divergent light from causing light leakage in the dark-state of the display panel. However, this may cause the width of the light-transmitting portion to be reduced, and may cause adverse effects such as an influence on the aperture ratio of the light-transmitting portion, and reduction in light utilization efficiency of the display panel.

Figure 2:
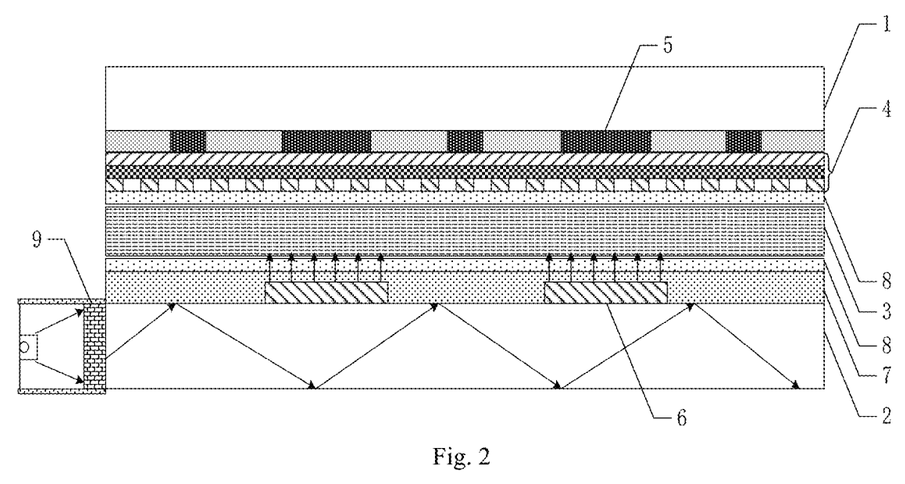
FIG. 2 is a schematic cross-sectional view of a liquid crystal display panel according to some embodiments of the present disclosure.

For addressing at least one of the above defects, a liquid crystal display panel is provided according to some embodiments of the present disclosure as shown in FIG. 2 which illustrates a schematic cross-sectional schematic diagram of the liquid crystal display panel. Some embodiments of the present disclosure provide a liquid crystal display panel. The liquid crystal display panel includes a first substrate 1, a liquid crystal layer 3, and an electrode layer 4. The electrode layer 4 includes a plurality of discrete electrodes. The liquid crystal layer is configured to form an array of liquid crystal optical elements in accordance with the voltages of the electrodes.

In some embodiments, the liquid crystal display panel further includes a controller. The controller is coupled to each of the electrodes for controlling the voltages of the electrodes. The controller can be implemented by a circuitry; however, the disclosure is not limited thereto. For example, it is also possible to perform a digital control in digital domain by a software or a firmware and apply voltages to the corresponding electrodes through circuitry such as, but not limited to, a DAC or the like in analog domain.

Voltages are applied through the electrodes so that the liquid crystal layer 3 forms an array of liquid crystal optical elements (for example, liquid crystal lenses) to guide the light incident on the liquid crystal layer 3 to the light-shielding portion 5 of the first substrate 1. Alternatively, by controlling the voltages of the electrodes, the liquid crystal layer 3 is formed into a liquid crystal grating to guide (or redirect) the light incident on the liquid crystal layer 3 to the light-transmitting portion 201 of the first substrate 1 and emitted.

Here, the liquid crystal optical element is an optical element formed of liquid crystal molecules. The liquid crystal lens is a lens formed of liquid crystal molecules. The liquid crystal grating is an array of liquid crystal optics having a grating function. The liquid crystal optical member comprises, but is not limited to, a liquid crystal lens, and may comprise, for example, a liquid crystal prism or the like.

In addition, the light-shielding portion 5 may be a light-blocking member such as a light-shielding layer or a portion on which a light-shielding layer is formed. In some embodiments, the display panel further includes a second substrate 2. In some implementations, the electrode layer 4 may be located on the first substrate 1 or on the second substrate 2. For example, as the liquid crystal display panel, an AOC (Array on Color-filter) substrate may be employed, that is, the electrode layer 4 is formed on the first substrate 1. The liquid crystal layer 3 is disposed between the AOC substrate and the second substrate 2, thereby simplifying the internal structure of the liquid crystal display panel. Thus, the number of layers through which the light emitted from the light source member 9 passes is reduced, thereby reducing the loss of light, and the transmittance of the liquid crystal display panel can be improved. In practical applications, the liquid crystal display panel may further include an optional filler layer 7 for planarizing the surface having the light-extracting member 6 formed thereon, and an alignment layer 8 for providing surface anchoring energy to the liquid crystal molecules in the liquid crystal layer 3.

In some embodiments, the second substrate 2 in the liquid crystal display panel may be a light guide plate. The light source 9 is coupled to the second substrate 2, for example, through an optical coupler, to emit light into the second substrate 2. In some embodiments, the optical coupler can be a part of the light source 9. In some embodiments, the second substrate may be configured such that the light received from the light source 9 is totally reflected in the second substrate. For example, the light source 9 can be configured to emit the light in a certain range of exit angles so that the emitted light can be totally reflected at the surfaces of the second substrate, as shown in FIG. 3 which will be further described in detail below.

In some embodiments, the filler layer 6 can be configured so that light is not extracted from the light guide plate through the filler layer which is in contact with the light guide plate. In some embodiments, the filler layer 6 can be formed of material(s) with low refractive index(es) to provide a fully reflective interface to the second substrate, so as to ensure total reflection propagation of light in the light guide. In addition, the diffraction efficiency of the light-extracting member (e.g., light-extracting grating) can be thus ensured. The larger the refractive index difference between the low refractive index material(s) and the light guide plate is, the higher the diffraction efficiency is. In some embodiments, the second substrate 2 may be configured such that light is extracted out from the light guide plate only through the region in which the light-extracting member 6 is formed. An example of the light-extracting member 6 may be a grating that can extract light from the light guide plate, which is totally reflected in the light guide plate, at an angle smaller than the total reflection angle by diffraction.

Figure 3:
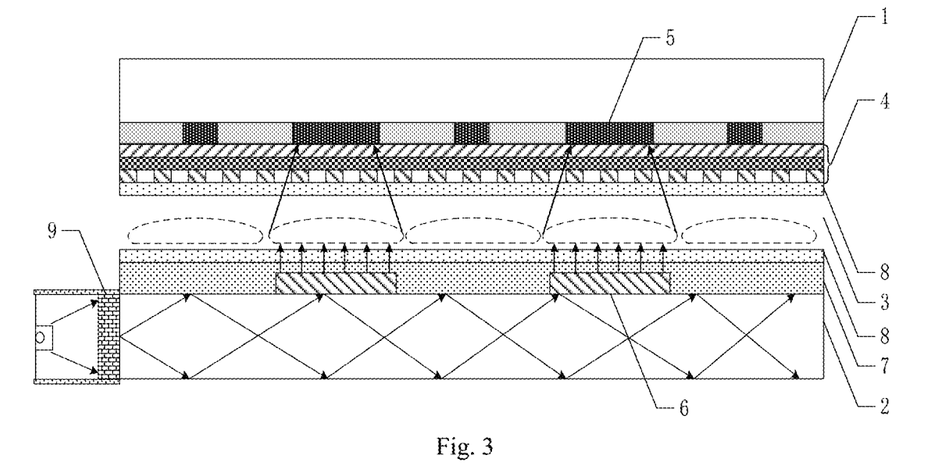
FIG. 3 is a schematic cross-sectional view of a liquid crystal display panel according to some embodiments of the present disclosure.

FIG. 3 illustrates a schematic cross-sectional view of a liquid crystal display panel when a dark-state display is performed. A liquid crystal lens corresponding to a set of electrodes can be formed by making the voltage of the intermediate electrode in an middle position or an intermediate position in the set of electrodes different from the voltages of the electrodes located on both sides in the set of electrodes. In some embodiments, the set of electrodes may consist of at least three adjacent electrodes. When the electric field for driving the liquid crystal molecules in the liquid crystal display panel to deflect is a parallel electric field, and the polarization direction of the light is parallel to the initial direction of the long axes of the liquid crystal molecules, the voltage of the intermediate electrode in a set of electrodes can be controlled to be smaller than the voltages of the electrodes located on two sides in the set of electrodes such that in the portion of the liquid crystal layer 3 which is corresponding to the position of the set of electrodes, the liquid crystals in the intermediate have a large phase and the liquid crystals at both ends have small phases. Thus, the liquid crystal layer 3 can be formed to have an equivalent phase profile (or, topography) equivalent to a convex lens.

Alternatively, when the electric field for driving the liquid crystal molecules in the liquid crystal display panel to deflect is a vertical electric field, and the polarization direction of the light is perpendicular to the initial direction of the long axes of the liquid crystal molecules, the voltage of the intermediate electrode in a set of electrodes may be controlled to be greater than the voltages of the electrodes at both sides in the set of electrodes such that in the portion of the liquid crystal layer 3 which is corresponding to the position of the set of electrodes, the intermediate liquid crystals have a large phase and the liquid crystals at both ends have a small phase. As a result, the liquid crystal layer 3 forms a phase profile equivalent to a convex lens.

Although convex lenses are illustrated and described herein as an example of optical member, the present disclosure shall not be limited thereto, and other forms of optical elements are also possible, such as (but not limited to) prisms, as long as they can guide/redirect the light on basis of the principles of the embodiments disclosed herein.

When the liquid crystal display panel is in a dark-state (or when the display panel perform a display in a dark-state), the liquid crystal optical members (for example, liquid crystal lenses) are formed, and the light incident on the liquid crystal layer 3 can be redirected (e.g., concentrated) by the liquid crystal lenses to the light-shielding portion 5 of the first substrate 1. In this way, the irradiation of light in the dark-state display mode can be controlled, and the possibility of dark-state light leakage can be avoided or reduced. In addition, it is also possible to reduce the area of the light-shielding portion (that is, the area where the first substrate 1 is irradiated with light in the dark-state), and still effectively avoid dark-state light leakage of the display panel. In the case that the light is concentrated by the liquid crystal optical member, the width of the light-shielding portion can be further reduced.

Figure 4:
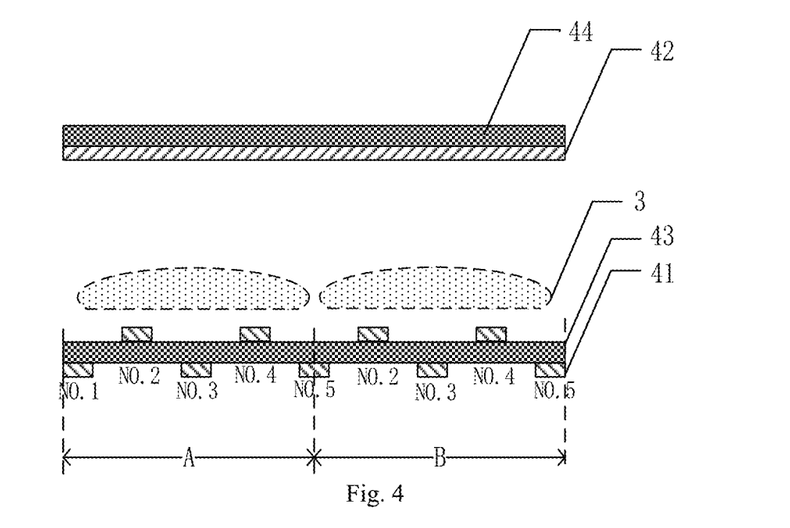
FIG. 4 is a first schematic diagram of a liquid crystal lens according to some embodiments of the present disclosure.

In some embodiments, two adjacent sets of electrodes can share one electrode. In the case where two adjacent sets of electrodes share one electrode, the complexity of the control can be reduced, so that the design of the control circuit can be simplified. FIG. 4 is a schematic diagram showing the effect of a liquid crystal lens provided by some embodiments of the present disclosure. In the liquid crystal display panel, the electrode layer 4 includes a pixel electrode 41. The pixel electrode 41 may be disposed on an insulating layer 43. The liquid crystal display panel further includes a common electrode 42. A liquid crystal layer 3 is positioned between the pixel electrodes 41 and the common electrode 42. The common electrode 42 may be disposed on an additional substrate 44 which faces the substrate, to which the pixel electrodes are formed, with the liquid crystal layer interposed therebetween. The pixel electrodes 41 may be disposed on the same surface of the insulating layer 43 as shown in FIG. 3, or may be alternately disposed on both surfaces of the insulating layer 43 as shown in FIG. 4. For example, when a set of electrodes is composed of five adjacent pixel electrodes 41 and the electric field for driving the deflection of the liquid crystal molecules is a parallel electric field, for two adjacent sets of electrodes, i.e., electrode group A and electrode group, the fifth electrode No. 5 of the electrode group A and the first electrode No. 1 of the electrode group B may be the same electrode. That is, the last electrode of a set of electrodes may be the first electrode of an adjacent next set of electrodes. Thus, two adjacent sets of electrodes can share one electrode. If the voltages of respective electrodes in the set of electrodes are V1, V2, V3, V4, and V5 in order, the voltages of the electrodes can be controlled, for example, to satisfy V1>V2>V3 and V5>V4>V3. As such, the voltage of the intermediate electrode can be made smaller than the voltages of the electrodes located on both sides, thereby forming a liquid crystal lens. In some embodiments, the voltages of two electrodes in the set of electrodes which are symmetrical to the intermediate electrode may be equal to each other, so that the liquid crystal molecules at the positions corresponding the symmetrical electrodes may have the same deflection angle, thus the formed liquid crystal lens may have a symmetrical structure. In some embodiments, for the whole set of electrodes, the voltage(s) of the intermediate electrode(s) may be set less than the voltages of the electrodes located on both sides. For example, in some practical applications, under the premise of satisfying such a requirement for the whole set of electrodes, the voltages of two electrodes symmetrically arranged may be equal; for example, the voltages of the electrodes may be controlled to satisfy V1=V5≥V2=V4≥V3, to form a liquid crystal lens. In some cases, it can also be configured so that the voltages of two adjacent electrodes can be equal, for example, the voltages of the electrodes satisfy V1=V5≥V2=V4=V3.

Figure 5:
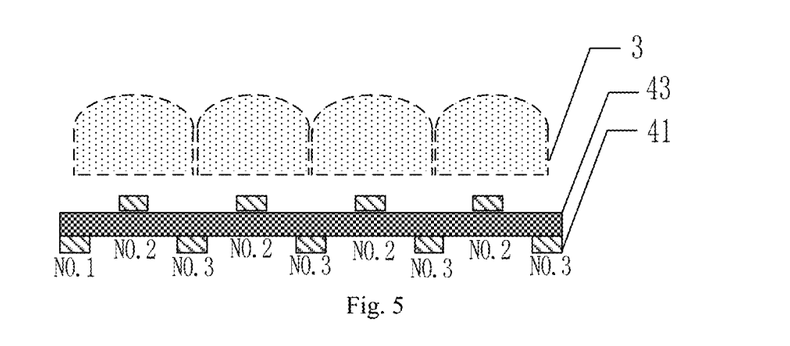
FIG. 5 is a second schematic diagram of a liquid crystal lens according to some embodiments of the present disclosure.
Figure 6:
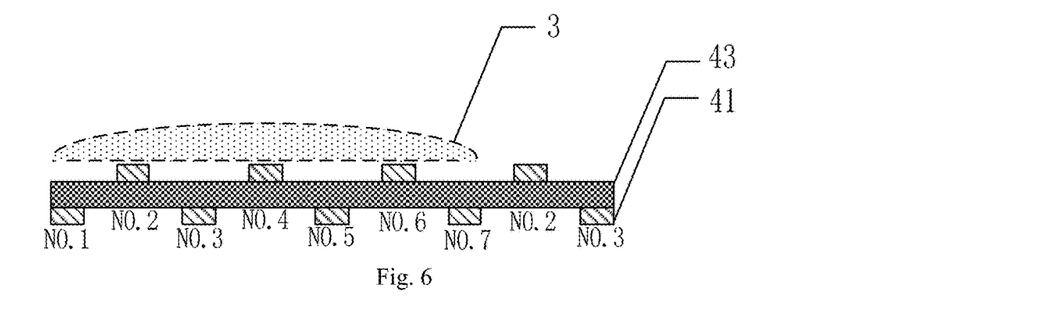
FIG. 6 is a third schematic diagram of a liquid crystal lens according to some embodiments of the present disclosure.

In some practical applications, the radial dimension of the liquid crystal lens can be adjusted by controlling the number of electrodes of a set of electrodes. For example, FIG. 5 and FIG. 6 respectively show a liquid crystal lens when of the corresponding set of electrodes includes three electrodes, and a liquid crystal lens when of the corresponding set of electrodes includes seven electrodes. As shown in the figures, generally, the larger the number of electrodes of a set of electrodes is, the larger the radial size of the corresponding liquid crystal lens is. Here, for the shapes of the electrodes in the electrode layer there is no particular limit, and for the shapes of the liquid crystal optical elements which are formed correspondingly there is also no particular limits, although the cross sections of the liquid crystal optical elements are shown as convex lenses in some of the drawings.

Figure 7:
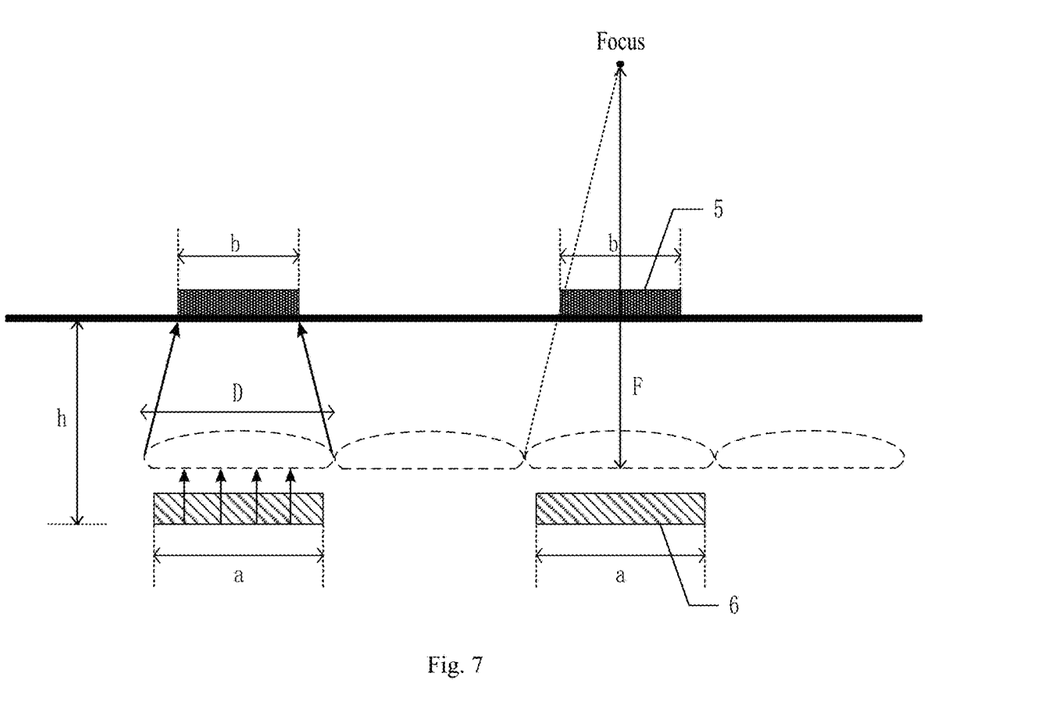
FIG. 7 is a schematic diagram of a positional relationship between a light-shielding layer and a light extracting member in a liquid crystal display panel according to some embodiments of the present disclosure.

In some practical applications, referring to FIG. 7, a schematic diagram of the positional relationship between the light-shielding portion and the light-extracting member in a liquid crystal display panel according to some embodiments of the present disclosure is shown. As shown in FIG. 7, assume that the width of the light extracting member 6 is a, the width of the light-shielding portion 5 is b, the radial dimension of the liquid crystal lens is D, the focal length of the liquid crystal lens is F, and the distance between the surface on which the light extracting member 6 is located and the lower surface of the light-shielding portion 5 is h. According to the geometric relationship, it can be obtained:

$$(b/2)/(D/2)=(F-h)/F.$$

That is, b=(1−h/F)*D.

Therefore, the width b of the light-shielding portion 5 of the first substrate 1 is positively related to the radial dimension D and the focal length F of the liquid crystal lens. The width b of the light-shielding portion 5 of the first substrate 1 may be determined according to the radial dimension D of the liquid crystal lens, the focal length F of the liquid crystal lens, and the distance h between the surface on which the light extracting member 6 is located and the lower surface of the light-shielding portion 5. In some practical applications, the radial dimension of the liquid crystal lens may be greater than or equal to the width of the light-extracting member 6 so that the light emitted from the light-extracting member 6 can all pass through the corresponding liquid crystal lens. Therefore, it can be ensured that when the liquid crystal display panel is in the dark-state, the light incident on the liquid crystal layer 3 can be guided (e.g., converged) to the light-shielding portion 5 of the first substrate 1, effectively avoiding light leakage in the dark-state of the display panel. In some practical applications, the width b of the light-shielding portion 5 on the first substrate 1 is generally set to be smaller than the radial dimension D of the liquid crystal lens, and is also smaller than the width a of the light-extracting member 6. However, in the prior art, the width b of the light-shielding portion 5 is a=(h*tan θ+d)*2. Therefore, in the embodiments of the present disclosure, the width of the light-shielding portion 5 can be greatly reduced as compared with the prior art, thereby effectively increasing the aperture ratio of the display panel and increasing the light utilization efficiency of the liquid crystal.

Figure 8:
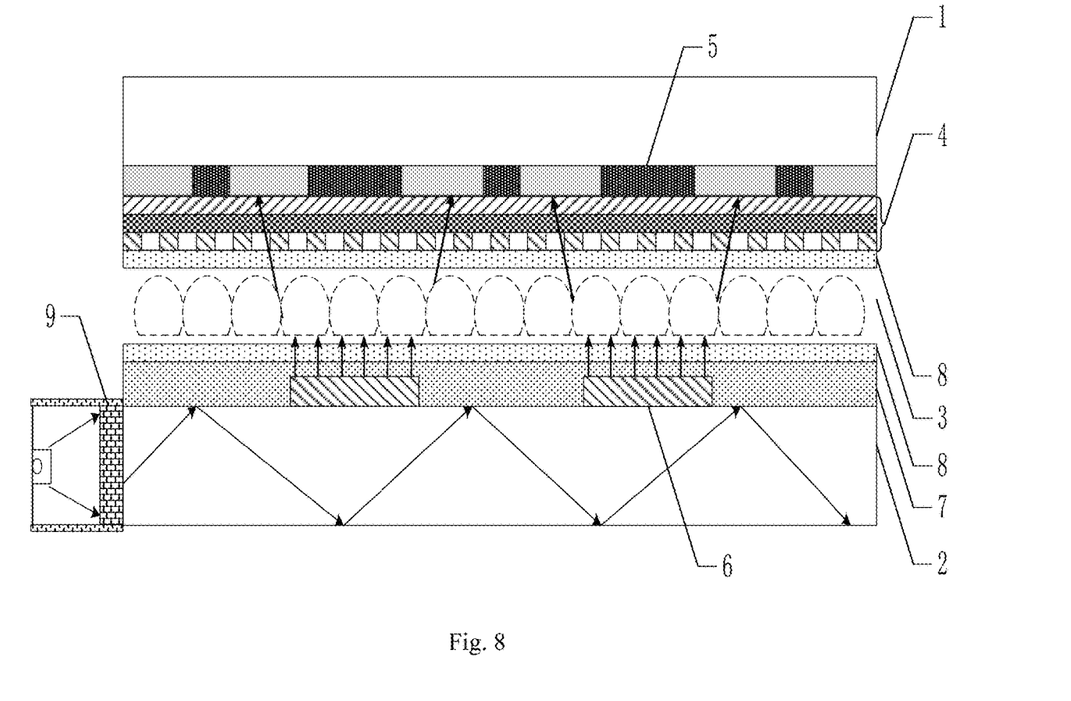
FIG. 8 is a first schematic cross-sectional view of a liquid crystal display panel according to some embodiments of the present disclosure.
Figure 9:
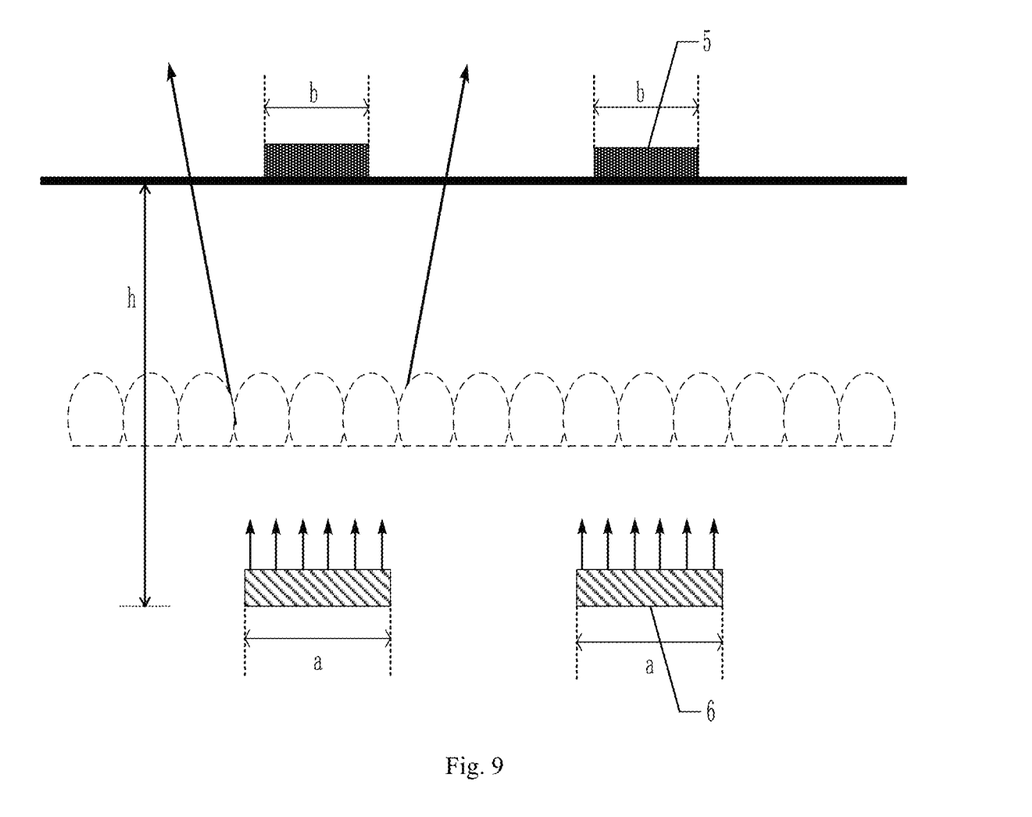
FIG. 9 is a second schematic diagram showing a positional relationship between a light-shielding layer and a light-extracting member in a liquid crystal display panel according to some embodiments of the present disclosure.

FIG. 8 shows a schematic view of a schematic sectional structure of a liquid crystal display panel in grayscale display mode according to some embodiments of the present disclosure. FIG. 9 shows a schematic diagram of a positional relationship between a light-shielding section and a light-extracting member in a liquid crystal display panel provided by some embodiments of the present disclosure. Descriptions will be given below with reference to FIGS. 8 and 9. An array of liquid crystal optics, such as a liquid crystal grating, can be formed by controlling the voltages of the electrodes in each electrode cycle to be equal. The light incident on the liquid crystal layer 3 is subjected to diffraction and refraction of the liquid crystal grating and is emitted from the light-transmitting portion of the first substrate 1, thus a gray-scale display of the liquid crystal display panel can be realized. In some embodiments, each electrode cycle includes one electrode and an electrode void. The electrode gap refers to the gap between two adjacent electrodes. The diffraction efficiency of the liquid crystal grating to light is positively related with the height (or thickness) of the liquid crystal grating. In some embodiments, as the voltages at the electrodes increase, the field strength that drives the liquid crystal to deflect will be increased, thereby deflecting liquid crystal molecules that are located further from the electrodes. As the liquid crystal molecules that are deflected increase, the height of the liquid crystal grating increases, and the diffraction efficiency of the liquid crystal grating increases. The higher the liquid crystal grating is, the larger the diffraction efficiency of the liquid crystal grating is. And the diffraction efficiency of the liquid crystal grating to the light is positively related with the height of the liquid crystal grating. In addition, as the diffraction efficiency of the liquid crystal grating increases, the intensity of light emitted from the first substrate 1 also increases.

Therefore, the height of the liquid crystal grating can be adjusted by controlling the field strength of the field to control the deflection of the liquid crystals, thereby the gray scale value to be displayed by the liquid crystal display panel during gray-scale display mode can be adjusted. For example, if there are a total of 256 gray scales of L0-L255 for the liquid crystal display panel, the gray scale value of the liquid crystal display panel can be adjusted between L0 and L255 by controlling the voltages of the electrodes in respective electrode cycles so as to be displayed. Here, the gray scale of L0 is also termed as dark-state.

Figure 10:
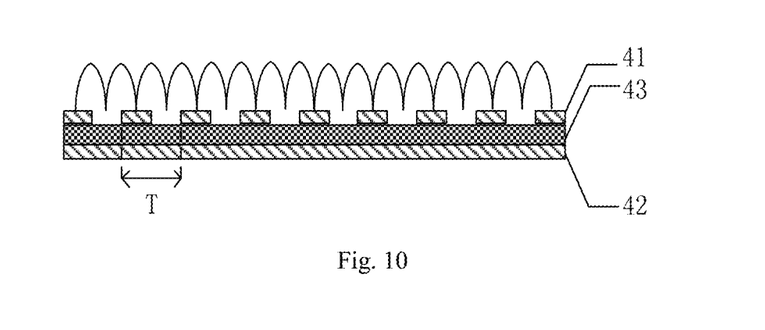
FIG. 10 is a schematic diagram of a liquid crystal grating according to some embodiments of the present disclosure.

In some practical applications, at least one liquid crystal grating unit may be formed in one electrode cycle, so that the pitch (indicated by T) of the liquid crystal grating units is small. The smaller the pitch of the liquid crystal grating is, the higher the diffraction efficiency of the liquid crystal grating is. Therefore, the pitch of the liquid crystal grating can be reduced by increasing the number of liquid crystal grating units in each electrode period or reducing the width of the electrode cycle, thereby improving the diffraction efficiency of the liquid crystal grating. For example, as shown in FIG. 10, in an electrode structure with planar electric field, the pixel electrodes 41 and an opposite electrode (e.g., common electrode 42) are respectively located on a side of the liquid crystal layer 3, and two liquid crystal grating units may be formed in one electrode cycle, that is, each pixel electrode 41 corresponds to two liquid crystal grating units. In this case, the pitch of the liquid crystal grating is relatively small and the diffraction efficiency is significant. In some practical applications, the electrode structure may be an electrode structure in an Advanced Super Dimension Switch (ADS) display panel, or may be an electrode structure in In-Plane Switching (IPS) display panel, Vertical Alignment (Vertical Alignment, VA) display panel, or the like. For the electrode structure there is no special limitation in the embodiments of the disclosure. In addition, it should also be understood that the present disclosure is not limited to the above embodiments. For example, a plurality of electrodes can also be used to form a liquid crystal grating unit.

In some embodiments, the second substrate 2 in the liquid crystal display panel may be a light guide plate, and at least one light-extracting member 6 is disposed on a light exit surface of the second substrate 2. The light-extraction member 6 is used to incident light onto the liquid crystal layer 3. In some embodiments, the light emitted from the light source member 9 is totally reflected at the non-light-extracting part in the light guide plate and exits at the light-extracting member leaving the light guide plate. Light can be incident onto the liquid crystal layer 3 directly through the light-extracting member 6. Therefore, a substrate made of glass or the like can be omitted, and thus such a situation can be avoided that light exited from the light guide plate enters the liquid crystal layer 3 after passing through a substrate of a material of such as glass. Thereby, the loss of light due to the substrate is effectively reduced, and the utilization efficiency of light is improved. In some embodiments, the light source member 9 may include a light strip and a coupling grating. The light strip may be located on the side of the light source member 9 away from the light guide plate, and the coupling grating may be located on the side of the light source member 9 close to the light guide plate. The coupling grating is used to converge the light emitted from the light strip with a large divergence angle into light of a smaller divergence angle, to ensure that the exit angle of the outgoing light is greater than the critical angle of total reflection of light in the light guide plate, so that the light emitted from the light source member 9 and incident on the light guide plate can achieve total reflection propagation in the light guide plate. A reflecting sheet can also be arranged above and/or under the light strip, so that the light emitted from the upper portion and/or the lower portion of the light strip can be reflected to the coupling grating so as to increase the utilization of light. In some practical applications, the light source member 9 may be a point light source, a side light source, or the like. The light provided by the light source member 9 may be white light or monochromatic light.

According to the liquid crystal display panel provided by the embodiments of the present disclosure, the voltages of the electrodes can be controlled (or, the voltages can be applied through the electrodes) so that the liquid crystal layer 3 forms a liquid crystal lens to guide/redirect the light incident on the liquid crystal layer 3 to the light-shielding portion 5 of the first substrate 1 (for example, in dark-state display mode).

Alternatively, the liquid crystal layer 3 can be formed into a liquid crystal grating by controlling the voltages of the electrodes (or by applying the voltages through the electrodes) to guide/redirect the light incident on the liquid crystal layer 3 to the light-transmitting portion of the first substrate 1 to be emitted (for example, in grayscale display mode). In other words, the liquid crystal grating cause the light incident on the liquid crystal layer 3 to exit through the light-transmitting portion of the first substrate 1. In such a case, the guiding may be conducted by diffraction and/or refraction of the liquid crystal optical elements formed in the liquid crystal layer.

Therefore, the width of the light-shielding portion 5 can be reduced, and light leakage under the dark-state of the display panel can still be prevented. In addition, by reducing the width of the light-shielding portion 5 (e.g., the width shown in the drawing), the width of the light-transmitting portion can be increased, thereby increasing the aperture ratio of the display panel and increasing the light utilization efficiency of the liquid crystal display panel.

In addition, according to some embodiments of the present disclosure, there is also provided a liquid crystal display device, which includes the liquid crystal display panel according to any embodiment of the present disclosure. Specifically, the liquid crystal display device may be any device that uses a liquid crystal display panel to realize a display function, including (but not limited to): a product such as a mobile phone, a tablet computer, a television set, a display, a notebook computer, a digital photo frame, a navigator, or the like; or a part of a product.

Figure 11:
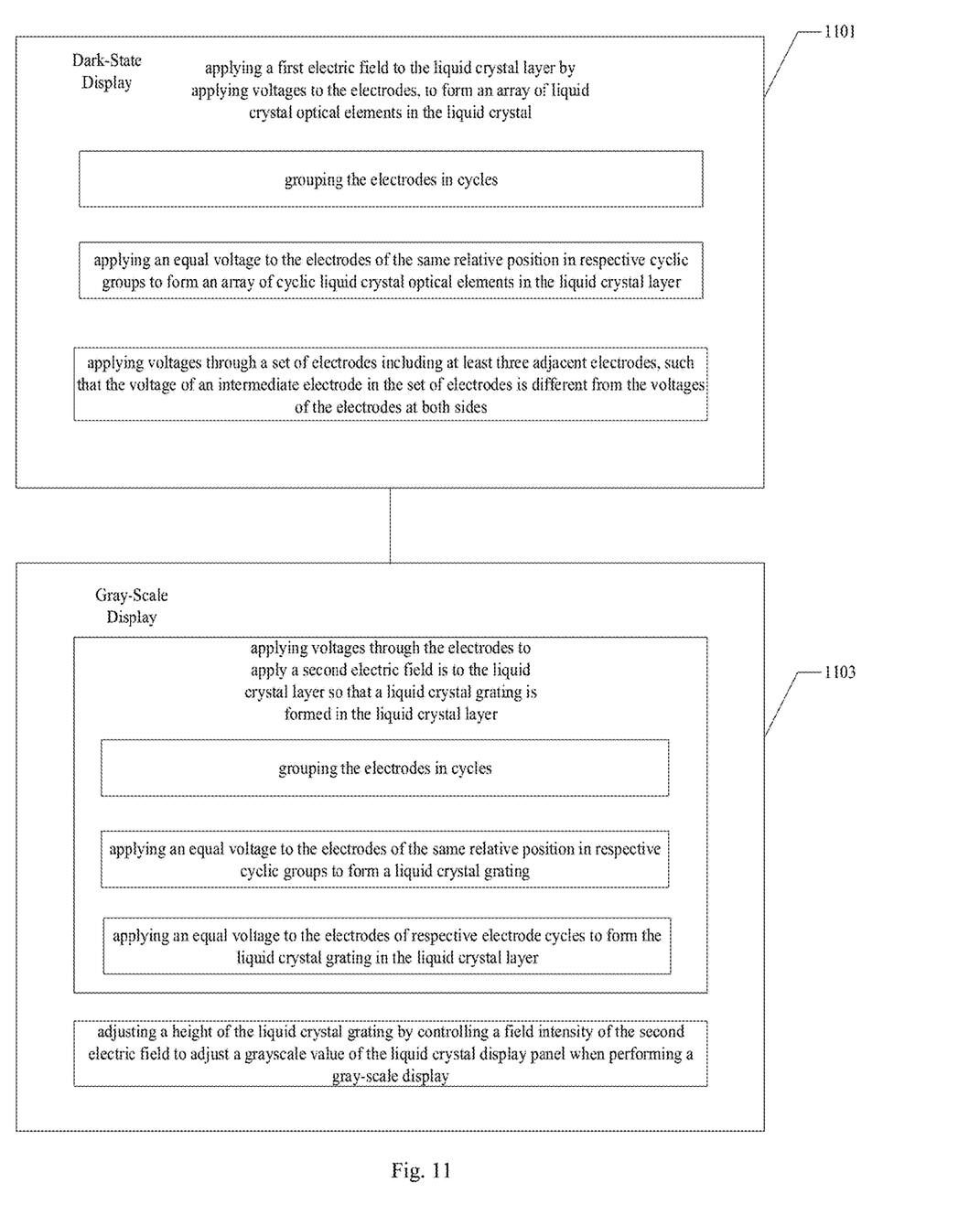
FIG. 11 is a flow chart of a display method according to some embodiments of the present disclosure.

According to some embodiments of the present disclosure, there is also provided an operation method for a liquid crystal display panel. The method can be applied to a liquid crystal display panel according to any of the embodiments. FIG. 11 is a flow chart of the method provided by some embodiments of the present disclosure.

As shown in FIG. 11, in step 1101, when performing a dark-state display (or to say, in a dark-state display mode), the voltages of the electrodes are controlled to apply a first electric field to the liquid crystal layer to form an array of liquid crystal optical elements (for example, lenses) in the liquid crystal layer. The array includes at least one liquid crystal lens.

In the dark-state display mode, a first electric field may be applied to the liquid crystal layer 3 by controlling the voltages of the electrodes of the electrode layer (that is, applying voltages through the electrode) so that an array of liquid crystal optical elements such as liquid crystal lenses is formed in the liquid crystal layer 3. Therefore, the light incident on the liquid crystal layer 3 can be guided or restrained (e.g., converged) to the light-shielding portion 5 of the first substrate 1, and light can be prevented from being emitted from the light-transmitting area between the light-shielding portions 5 so that light leakage in the dark-state can be prevented.

In some implementations, the plurality of discrete electrodes in electrode layer 4 may be grouped into sets of electrodes. In each set of electrodes, the voltage at the intermediate electrode is made different from the voltages at the electrodes on both sides to form the first electric field. Thereby, a liquid crystal optical element corresponding to the set of electrodes can be formed. In some embodiments, a set of electrodes may consist of at least three adjacent electrodes. When the first electric field is a parallel electric field, and the polarization direction of the light is parallel to the initial direction of the long axes of the liquid crystal molecules, the voltage of the intermediate electrode may be lower than the voltages of the electrodes located on both sides in the set of electrodes. Thus, in the liquid crystal layer 3 at the position corresponding to the set of electrodes, the liquid crystals in the intermediate position have a large liquid crystal phase, and the liquid crystals at both ends have a small phase. As a result, the liquid crystal layer 3 forms an equivalent phase topography equivalent to a convex lens. Alternatively, when the first electric field is a vertical electric field, and the polarization direction of the light is perpendicular to the initial direction of the long axes of the liquid crystal molecules, the voltage of the intermediate electrode in the set of electrodes may be greater than the voltages of the electrodes located on both sides. Thus, the liquid crystals at intermediate position in the portion of the liquid crystal layer 3 which portion is at the position corresponding to the set of electrodes has a large liquid crystal phase, and the liquid crystals at both ends have a small phase. As a result, the liquid crystal layer 3 forms an phase topography equivalent to a convex lens. By forming the liquid crystal lens when the liquid crystal display panel is in a dark-state and guiding (for example, converging) the light incident on the liquid crystal layer 3 through the liquid crystal lens, the area of the first substrate 1 irradiated with light in a dark-state can be effectively reduced. Therefore, it is possible to reduce the light-shielding portion 5 of the first substrate 1 (that is, the portion to block light irradiation in the dark-state mode), while still effectively avoiding dark-state light leakage of the display panel. And, the aperture ratio of the pixels can be increased.

In step 1102, when performing a gray-scale display (or in the gray-scale display mode), the voltages of the electrodes are controlled (or, the voltages are applied through the electrodes) to apply a second electric field to the liquid crystal layer to form a liquid crystal grating.

For example, when performing gray-scale display, voltages may be applied through the electrodes to apply a second electric field to the liquid crystal layer 3 to make the liquid crystal layer 3 form a liquid crystal grating. Thereby, the light incident on the liquid crystal layer 3 is diverged to the light-transmitting portions of the first substrate 1 and emitted therethrough. The width of the light-shielding portion 5 is reduced so that the area of the light-transmitting portion is increased, so that the light flux emitted from the first substrate 1 is increased. Therefore, the aperture ratio of the display panel is effectively increased, and the utilization efficiency of light by the liquid crystal layer is increased.

In some embodiments, the second electric field may be formed by dividing the plurality of discrete electrodes of the electrode layer 4 into a plurality of electrode cycles and controlling the voltages of the corresponding electrodes in each of the electrode cycles to be equal. In addition, when performing a grayscale display, the height of the liquid crystal grating can be adjusted by controlling the field intensity of the second electric field, so as to adjust the grayscale value to be displayed by the liquid crystal display panel in the grayscale display mode. In some practical applications, when the second field strength is increased, liquid crystal molecules which are further away from the electrode can be deflected. As the number of the liquid crystal molecules that are deflected is increased, the height of the liquid crystal grating is increased, and the light diffraction efficiency of the liquid crystal grating is increased. The higher the liquid crystal grating is, the greater the light diffraction efficiency of the liquid crystal grating is. That is to say, the light diffraction efficiency of the liquid crystal grating is positively related with the height of the liquid crystal grating. In addition, as the light diffraction efficiency of the liquid crystal grating is increased, the intensity of light emitted from the first substrate 1 is also increased. Therefore, the height of the liquid crystal grating can be adjusted by controlling the field strength of the second electric field, thereby the gray scale value of the liquid crystal display panel in gray-scale display mode can be adjusted.

In summary, according to the method provided in the embodiments of the present disclosure, when performing a dark-state display, voltages are applied through the electrodes of the electrode layer to apply a first electric field to the liquid crystal layer 3 so that the liquid crystal layer 3 forms liquid crystal lenses. Thus, light incident on the liquid crystal layer 3 can be guided or confined to the light-shielding portions 5 of the first substrate 1. When performing a gray-scale display, voltages are applied through the electrodes to apply a second electric field to the liquid crystal layer 3 so that the liquid crystal layer 3 forms a liquid crystal grating, and thus, light incident on the liquid crystal layer 3 is guided to the light-transmitting portions of the first substrate to emit. In the gray-scale displaying, the guiding may be performed by diffraction and/or refraction of the liquid crystal optical elements formed in the liquid crystal layer. Therefore, the width of the light-shielding portion 5 can be reduced, and dark-state light leakage of the display panel can still be prevented. Moreover, the width of the light-transmitting portion can be increased, thereby effectively increasing the aperture ratio of the display panel and increasing the light utilization efficiency of the liquid crystal.

Here, it should be understood that the liquid crystal grating may be an array of liquid crystal optical elements (for example, liquid crystal lenses or liquid crystal prisms, etc.), and the array may function as a grating. The array may include one or more liquid crystal optical elements. Therefore, in some embodiments of the present disclosure, as shown in FIG. 11, applying voltages through the electrodes may comprise: grouping the electrodes cyclically; applying equal voltages to the electrodes in the same relative positions in respective cyclic groups, thus an array of cyclic liquid crystal optical elements is formed in the liquid crystal layer. In some embodiments, when performing a grayscale display, the array of liquid crystal optical elements is used as a liquid crystal grating. When performing a dark-state display, a first grouping of electrodes of the electrode layer is performed, and voltages are applied through the grouped electrodes, so that an array of liquid crystal optical elements having a first pitch (e.g., a large pitch) is formed in the liquid crystal layer. Thereby, the light incident onto the liquid crystal layer is restrained or guided to the light-shielding portions of the first substrate (for example, the substrate facing the object to observe the display). In the gray-scale displaying, the electrodes of the electrode layer are subjected to a second grouping, and voltages are applied through the grouped electrodes, so that an array of liquid crystal optical elements having a second pitch (for example, a small pitch) is formed in the liquid crystal layer. Thus, the gray-scale display can be performed by diffraction (in some cases, and refraction) of the array of liquid crystal optical elements having the second pitch.

Heretofore, it should also be understood that the present disclosure provides a liquid crystal display panel, an operating method thereof, and a liquid crystal display device. According to the embodiments of the present disclosure, the sizes of the light-shielding portions can be reduced, and dark-state light leakage of the display panel can be effectively prevented. Also, the width of the light-transmitting portion can be increased, thereby increasing the aperture ratio of the display panel and increasing the light utilization efficiency of the liquid crystal display panel.

The embodiments in this specification may be described in a progressive manner, and each embodiment focuses on the difference(s) from other embodiments. And among the embodiments, the same or similar parts can be referred to each other.

The liquid crystal display panels, the methods and the liquid crystal display devices according to various embodiments of the present disclosure have been described in detail as above. Specific examples or embodiments are employed herein to describe the principles and implementations of the present disclosure. Therefore, the above embodiments are only used to help understand the principles and ideas of the present disclosure. It is obvious for those with ordinary skills in the art that the specific embodiments and the applications can be changed or modified based on the ideas of the present disclosure. Therefore, the contents of this specification should not be construed as limiting the scope of the present disclosure. Such changes or modifications that fall within the scope of the claims of the present application or the equivalents thereof will also be embraced within the scope of the present disclosure.

What is claimed is:

1. A liquid crystal display panel comprising: a first substrate including light-shielding portions and light-transmitting portions; an electrode layer including a plurality of discrete electrodes; a liquid crystal layer;
    wherein the liquid crystal layer is adaptable to form an array of liquid crystal optical elements according to voltages of the electrodes, and
    wherein the voltages of the electrodes are configured such that the array of liquid crystal optical elements formed in the liquid crystal layer guides light which is incident onto the liquid crystal layer, to the light-shielding portions of the first substrate, to perform a dark-state (LO) display,
    wherein the voltages of the electrodes are configured such that the array of the liquid crystal optical elements formed in the liquid crystal layer guides the light which is incident onto the liquid crystal layer, to the light-transmitting portions of the first substrate to emit the light, to perform a gray-scale display,
    wherein the array of the liquid crystal optical elements serves as a liquid crystal grating to perform the gray-scale display,
    wherein the electrodes are grouped in cycles, and voltages of the electrodes at same relative positions in the respective cyclic groups are configured to be equal, thereby an array of cyclic liquid crystal optical elements is formed, wherein the array of liquid crystal optical elements functions as the liquid crystal grating in the case of gray-scale display, and
    wherein two adjacent quips share one electrode.

2. The liquid crystal display panel according to claim 1, wherein
    each of the liquid crystal optical elements is configured to correspond to a set of electrodes; and
    the set of electrodes includes at least three adjacent electrodes, wherein a voltage at an intermediate electrode in the set of electrodes is different from voltages at the electrodes at both sides, so that the corresponding liquid crystal optical element is formed.

3. The liquid crystal display panel according to claim 1, wherein the liquid crystal display panel performs display with use of diffraction by the liquid crystal grating or with use of diffraction and refraction by the liquid crystal grating.

4. The liquid crystal display panel according to claim 1, wherein the electrodes are grouped in cycles, each of electrode cycles includes one electrode and a gap between the electrode and an adjacent electrode, and the voltages of the electrodes in the electrode cycles are equal to form the liquid crystal grating.

5. The liquid crystal display panel according to claim 3, wherein
the light diffraction efficiency of the liquid crystal grating is positively related to the height of the liquid crystal grating.

6. The liquid crystal display panel according to claim 1, wherein
the liquid crystal optical element is a liquid crystal lens, and
the width of the light-shielding portion of the first substrate is related to a radial size and a focal length of the corresponding liquid crystal lens.

7. The liquid crystal display panel according to claim 1, further comprising:
a second substrate with at least one light-extracting member disposed on a light-exit surface of the second substrate.

8. The liquid crystal display panel according to claim 7, wherein the electrode layer is disposed on a side of the first substrate, wherein the side of the first substrate is facing the liquid crystal layer;
the liquid crystal display panel further comprising an opposite electrode disposed oppositely to the electrode layer, and further comprising an insulating layer interposed between the electrode layer and the opposite electrode.

9. The liquid crystal display panel according to claim 7, wherein the electrode layer is disposed on a side of the first substrate, wherein the side of the first substrate is facing the liquid crystal layer;
the liquid crystal display panel further comprising an opposite electrode disposed on the second substrate, and the liquid crystal layer interposed between the electrode layer and the opposite electrode.

10. The liquid crystal display panel according to claim 7, wherein the electrode layer is disposed on a side of the first substrate, the side of the first substrate facing the liquid crystal layer,
wherein the first substrate has an opposite electrode disposed oppositely to the electrode layer with an insulating layer interposed therebetween,
wherein the liquid crystal layer is interposed between the first substrate and the second substrate,
the liquid crystal display panel further comprising:
a filler layer interposed between the second substrate and the liquid crystal layer.

11. An operating method for a liquid crystal display panel, wherein
the liquid crystal display panel comprises:
a first substrate including light-shielding portions and light-transmitting portions;
an electrode layer comprising a plurality of discrete electrodes; and
a liquid crystal layer,
the method comprising:
when performing a dark-state display, applying voltages through the electrodes to apply a first electric field to the liquid crystal layer so that the liquid crystal layer forms an array of liquid crystal optical elements to guide light, which is incident to the liquid crystal layer, to the light-shielding portions of the first substrate, and
when performing a gray-scale display, applying voltages through the electrodes to apply a second electric field to the liquid crystal layer so that a liquid crystal grating is formed in the liquid crystal layer to guide the light to the light-transmitting portions of the first substrate to emit the light,
wherein applying voltages through the electrodes when performing gray-scale display comprises:
grouping the electrodes in cycles; and
applying an equal voltage to the electrodes at the same relative positions in respective cyclic groups to form an array of cyclic liquid crystal optical elements in the liquid crystal layer,
wherein the array of the liquid crystal optical elements serves as the liquid crystal grating, and
wherein two adjacent groups share one electrode.

12. The method according to claim 11, wherein applying voltages through the electrodes comprises:
applying voltages through a set of electrodes including at least three adjacent electrodes, such that the voltage of an intermediate electrode in the set of electrodes is different from the voltages of the electrodes at both sides, thereby forming a respective liquid crystal optical element corresponding to the set of electrodes.

13. The method according to claim 11, further comprising: when performing a gray-scale display, adjusting a height of the liquid crystal grating by controlling a field intensity of the second electric field to adjust a grayscale value of the liquid crystal display panel.

* * * * *